United States Patent [19]

Ewy et al.

[11] Patent Number: 4,834,319

[45] Date of Patent: May 30, 1989

[54] DIFFERENTIALLY COUPLED DUAL CHANNEL ACTUATOR

[75] Inventors: Robert J. Ewy; Gary L. Burrell, both of Olathe, Kans.

[73] Assignee: Allied-Signal Inc., Morris Township, Morris County, N.J.

[21] Appl. No.: 104,683

[22] Filed: Oct. 5, 1987

[51] Int. Cl.$^4$ .............................................. B64C 13/34
[52] U.S. Cl. ................................... 244/75 R; 74/526; 74/675; 74/799
[58] Field of Search .................. 244/75 R, 76 R, 220, 244/221, 224, 226, 227, 228, 230, 231, 196, 197; 74/661, 675, 326, 799, 665 B

[56] References Cited

U.S. PATENT DOCUMENTS

| | | | |
|---|---|---|---|
| 2,620,683 | 12/1952 | Geyer | 244/75 R |
| 2,704,646 | 3/1955 | Vogel | 244/75 R |
| 2,951,397 | 9/1960 | Schroeder | 74/675 |
| 3,030,052 | 4/1962 | Grudin | 244/75 R |
| 3,140,843 | 7/1964 | Pettit | 244/197 |
| 3,263,946 | 8/1966 | Roberts et al. | 244/75 R |
| 3,563,104 | 2/1971 | Schuster | 74/675 |
| 3,592,317 | 7/1971 | Chillson | 244/231 |

Primary Examiner—Galen Barefoot
Attorney, Agent, or Firm—Howard G. Massung

[57] ABSTRACT

A dual channel actuator for regulating control surfaces of an aircraft such as a helicopter. Primary and secondary channels are coupled by a differential gear. An internal stop in the differential gear limits the short term range of travel or authority of the primary channel. The secondary channel allows extended long term authority by recentering the reference point about which the rotational range of the primary channel is determined. A servo motor and primary input gear of the differential gear comprise the primary channel. A second servo motor and secondary input gear comprise the secondary channel. The reference point comprises a stop pin coupled with said differential gear.

16 Claims, 2 Drawing Sheets

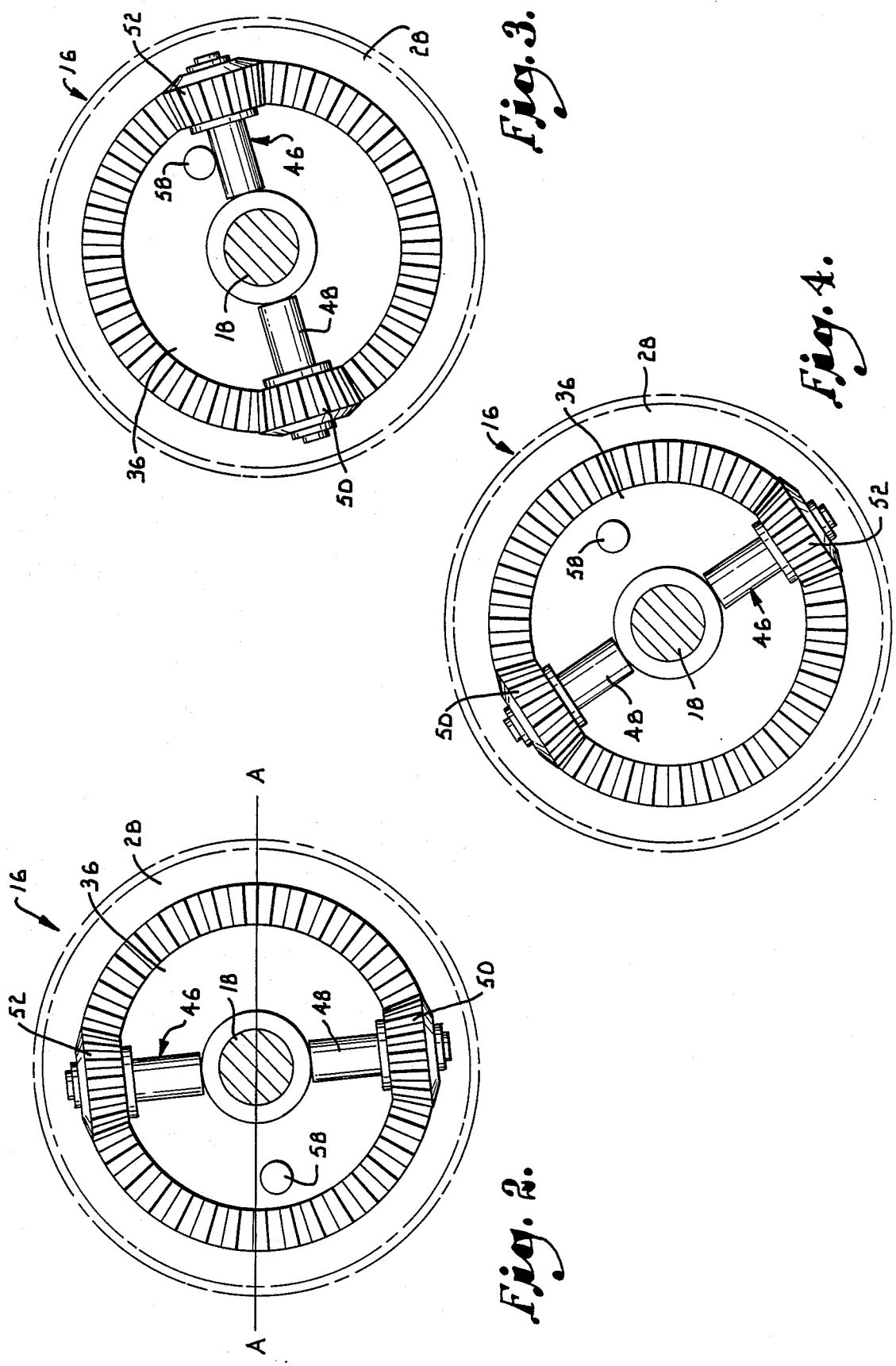

DIFFERENTIALLY COUPLED DUAL CHANNEL ACTUATOR

BACKGROUND OF THE INVENTION

This invention relates in general to control systems and, more particularly, to a dual channel actuator for use with an autopilot system to regulate control surfaces of an aircraft.

Conventional autopilot systems for aircraft such as helicopters utilize either series or parallel actuators which serve as the electro-mechanical interface between the autopilot computer and the mechanical control rod. Series actuators generally comprise a motorized jack-screw which is inserted in series or in line with the control rod. Movement of the jack-screw in response to signals from the autopilot computer regulates the control rod and aircraft control surfaces.

Placement of a jack-screw in series with the control rod does not allow the pilot to backdrive the actuator. This presents a serious problem if the autopilot or actuator malfunctions and the jack-screw expands too far. If this should occur, the only way to move the control rod and regain control of the aircraft is to drive the internal actuator motor in the appropriate direction. Malfunction of the actuator, however, would normally prevent operation of the motor, leaving the pilot without an effective means for repositioning the actuator.

The previous solution to this problem has been to limit the full travel range and hence the authority of the series actuator. A typical actuator range has been 10% of the full control range available to the pilot. If an autopilot or actuator malfunction should occur, the pilot would still have 90% of the control range available for manual flight control.

While limiting the travel range of the series actuator may be adequate for certain applications, it is a less than desirable solution from the standpoint of optimum autopilot performance.

Even though the autopilot system can be normalized so that the limited actuator travel provides adequate performance at an average air speed and weight, operation of the helicopter with a limited range of actuator travel at the extremes of its speed and weight flight envelope results in less than optimum flight performance.

Parallel actuators have also been utilized as the autopilot electro-mechanical interface. These actuators typically utilize a motor and spur gear reduction system that allows bi-directional rotational output. A bell crank or bridle cable assembly is often used to couple the actuator with the control rod.

Parallel actuators employ two safety features which are not found on series actuators. An internal disconnect mechanism allows the pilot to disengage the actuator's motor and gear reduction system from the output cable drum. This prevents the actuator from affecting the flight control system and restores complete control authority to the pilot.

An override slip clutch is another safety feature of parallel actuators and allows the pilot to overpower any actuator movement by moving the cockpit control to the desired position. The clutch is contained within the output cable drum and movement of the cockpit control causes the clutch to slip. This allows the output cable drum to rotate relative to the internal gear drive train and restores flight control to the pilot.

Even with the internal disconnect and the override slip features of the parallel actuator, it is still desirable to limit the full travel range or speed of the actuator in the event of autopilot or actuator malfunction. As with series actuators, restrictions on the authority of parallel actuators result in less than optimum autopilot performance when the aircraft is operated at the extremes of its flight envelope.

SUMMARY OF THE INVENTION

It is a primary object of this invention to provide a unique aircraft control system which permits optimal autopilot performance when the aircraft is operated at the extremes of its flight envelope.

A further object of this invention is to improve the safe operation of aircraft by providing a dual channel actuator in an aircraft control system which serves as an electro-mechanical interface between an autopilot computer and a mechanical control rod of an aircraft.

Yet another object of this invention is to provide a dual channel actuator of the character described with means for limiting the short term authority of the actuator so that flight control is maintained in case of autopilot or actuator malfunction, but which also allows full long term authority so that the autopilot system provides optimum performance at the extremes of the aircraft's speed and weight flight envelope.

To accomplish these and other related objects of the invention, an actuator is provided with primary and secondary servo motors. The motors are coupled through a differential gear which drives the mechanical control rod. The differential gear comprises a primary input gear driven by the primary motor, a secondary input gear driven by the secondary motor, and an output gear coupled with the control rod and differentially driven by the primary and secondary input gears. The primary motor has responsibility for regulating movement of the control rod. Means such as an internal stop are coupled with the differential gear for limiting short term movement of the primary input gear to a preselected range about a reference point. When the limit of the preselected range is reached and after a predetermined time delay, the secondary motor and input gear move the reference point in the direction of the range limit to extend the long term authority of the actuator. This allows for optimum performance as well as safe operation of the autopilot system even at the extremes of the aircraft weight and flight envelope.

BRIEF DESCRIPTION OF THE DRAWINGS

Referring now to the drawings, where like reference numerals are used to indicate like parts in the various views:

FIG. 2 is a sectional view taken along line 2—2 of FIG. 1; with portions rotated to new positions FIG. 3 is a view similar to FIG. 2 but with portions rotated to new positions; and FIG. 4 is a view similar to FIGS. 2 and 3 with portions rotated to still further positions.

DESCRIPTION OF THE PREFERRED EMBODIMENT

Figure 1:
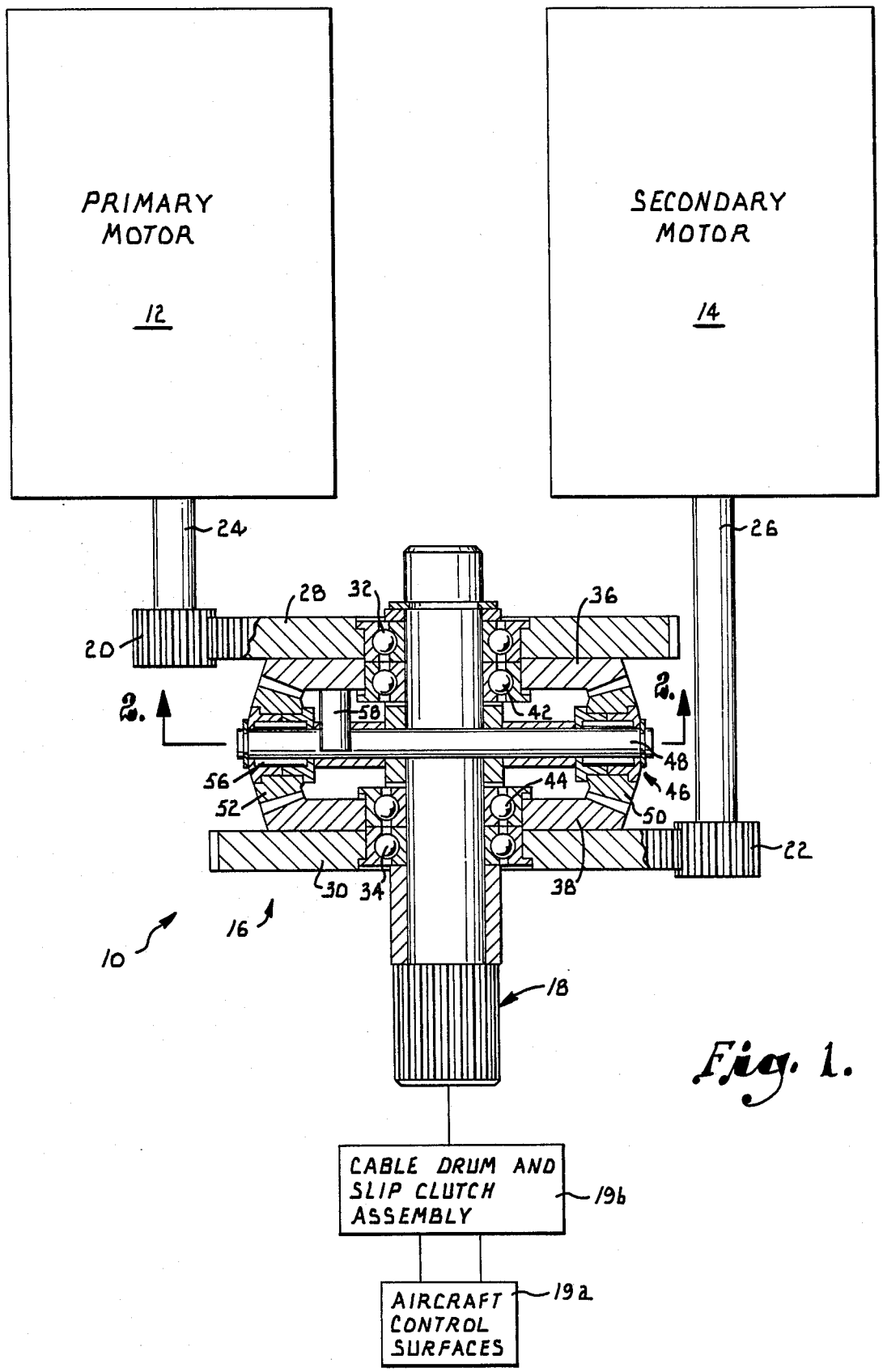
FIG. 1 is a side sectional view of a dual channel actuator of the present invention with portions represented schematically for purposes of illustration.

Referring now more particularly to the drawings, and initially to FIG. 1, a dual channel actuator of the present invention is represented generally by the numeral 10. Actuator 10 comprises a primary servo motor 12 and a secondary servo motor 14 which are coupled by a differential gear 16. Gear 16 is coupled with and drives an output shaft 18 which is linked to the control surfaces 19a of the aircraft through a cable drum and slip clutch assembly 19b or other suitable means.

Suitable and conventional interconnects (not shown in their entirety), couple servo motors 12 and 14 with an autopilot computer to form a servo system for performing the functions hereinafter described. Motors 12 and 14 have drive gears 20 and 22 mounted directly on drive shafts 24 and 26, respectively, although it will be recognized that other gearing combinations may be used.

Differential gear 16 comprises a pair of spaced apart end input gears 28 and 30 which are rotatably mounted on output shaft 18 by bearings 32 and 34. Input gears 28 and 30 are driven by primary and secondary motor drive gears 20 and 22, respectively. Beveled side gears 36 and 38 are fixedly secured to the facing inner surfaces of end input gears 28 and 30 and rotate on bearings 42 and 44. End input gear 28 and beveled side gear 36 comprise the primary input gear and gears 30 and 38 similarly comprise the secondary input gear. Gears 28 and 36 in combination with primary motor 12 may also be referred to as the primary channel of the actuator 10. Gears 30 and 38 in combination with secondary motor 14 comprise the secondary channel of the actuator.

A centrally positioned output gear 46 is differentially driven by side gears 36 and 38. Output gear 46 comprises a shaft or spider member 48 and beveled pinion gears 50 and 52 mounted on opposed ends of spider member 48. Spider member 48 is transversely coupled with output shaft 18. Pinion gears 50 and 52 are rotatably mounted on spider member 48 by bearings 54 and 56 and are positioned between and engage side gears 36 and 38.

Internal limiting means such as a stop pin 58 pressed into a side of beveled side gear 36 is used to limit the short term authority of the primary channel of the actuator. Pin 58 is fixed to gear 36 and extends downwardly a sufficient distance to engage spider member 48. Other means may also be used in place of the stop pin for serving the intended function.

The actuator 10 may be coupled with the control surfaces of the aircraft by various means. Actuator 10 is preferably utilized as a parallel actuator and coupled with the control rod by a bell crank or bridle cable assembly. An internal disconnect mechanism may be utilized to disengage the actuator from the output cable drum 19b. An override slip clutch may also be contained within the output cable drum to allow relative rotation between the output cable durm and the differential gear 16.

In operation, activation of the primary motor 12 in response to appropriate signals from the autopilot computer regulates movement of output shaft 18. This movement, in turn, regulates the control rod and control surfaces 19a of the aircraft. Motor 12 is preferably a fast motor which will supply the required adjustments to the output shaft 18 during short term perturbations of the aircraft. The stop pin 58 is designed to limit the short term authority of the primary motor by restricting the output gear 46 to a preselected rotational range of movement. The limits of the range are referenced to the position of the pin.

The secondary motor 14 is a slower motor than motor 12 and is used to move the pin in relation to the output shaft to allow continued rotation of the shaft a predetermined period of time after the limit of the range has been reached. This allows the short term authority of the actuator to be limited to the preselected range, but allows the long term authority to be extended by movement of the pin 58 which serves as the reference point about which the range of movement is determined.

The secondary motor 14 generally remains stationary as the primary motor responds to signals from the autopilot computer and drives gears 20, 28 and 36. This results in differential rotation of pinion gears 50 and 52 about an axis along spider member 48. Rotation of the pinion gears, in turn, causes spider member 48 to rotate about an axis along output shaft 18. This results in rotation of output shaft 18 about the same axis.

Referring now to FIGS. 2-4, the operation of the differential gear 16 will be explained in greater detail. Turning initially to FIG. 2, the stop pin 58 is shown oriented at a position rotated approximately 10° below reference line A—A. Spider member 46 is positioned approximately 80° above the reference line. When the primary motor 12 drives the gears 28 and 36, the stop pin 58 limits the rotational range of the spider member 48 to approximately 160°. However, the range may be adjusted to that desired by utilizing various suitable means such as an additional stop pin to produce a more limited range of rotational freedom.

Turning now to FIG. 3, gears 28 and 36 and stop pin 58 have been driven clockwise approximately 160° by the primary motor while the secondary motor is stationary. This rotation has driven the pinion gears 50 and 52 and moved the spider member 48 clockwise approximately 80°, bringing it into contact with the stop pin. The primary motor 12 has thus reached the limit of its short term authority as further clockwise rotation of the gears 28 and 36 is prevented by stop pin 58.

As the motor 12 continues to attempt to drive the gears in a clockwise direction, a signal is sent to the secondary motor 14 after a predetermined period of time. The delay in activating the secondary motor 14 after the rotational range limit is reached may be varied as desired. Various means may be used to sense when the primary motor 12 drives the stop pin 58 onto the spider member 48. Examples of suitable mechanisms include a primary drive motor current sensor, a Hall effect position sensor, an electromagnetic or optical position sensor, and a sensing switch coupled with the stop pin.

After receipt of the signal indicating that the primary motor 12 has reached the limit of its short term authority, the secondary motor drives the gears 30 and 38 (see FIG. 1) in the same direction as the primary motor is attempting to drive gears 28 and 36. Secondary motor 14 drives the gears until the pin 58 is positioned midway between pinion gears 50 and 52. This recenters the reference point about which the rotational range of the spider member 48 is determined, thus extending the long term authority of the primary motor 12.

The recentering feature of the secondary motor 14 is best illustrated in FIG. 4, where the secondary motor has driven gears 30 and 38 clockwise approximately 160° from the position illustrated in FIG. 3. For purposes of illustration it has been assumed that the primary motor is stationary while the secondary motor is activated. In actual operation, it may be desired that both motors operate simultaneously. The gear rotation drives the spider member clockwise approximately 80°, centering the stop pin within the rotational range of spider member 48. The primary motor 12 may now continue to drive the spider member 48 and hence the output shaft 18 in the clockwise direction. The long term authority of the primary motor is thus maintain while the short term authority remains restricted to the 160° rotational range of the spider member.

It can thus be seen that the dual channel actuator 10 provides a means for limiting the short term authority of the primary motor 12 by limiting the rotational freedom of the motor 12 to a preselected range about pin 58 which serves as a reference point. To maintain the desired autopilot performance at the extremes of the weight and flight envelope, the extended long term authority of the primary motor may be maintained by utilizing the secondary motor 14 to reposition the point about which the range of rotation is referenced. This has the effect of extending the rotational freedom of the primary motor, thus ensuring optimum performance as well as safe operation of the autopilot system at the extremes of the aircraft weight and flight envelope.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. An aircraft control system having a dual channel actuator for regulating control surfaces of the aircraft, said actuator comprising:
    a primary motor;
    means coupling said primary motor with said control surfaces, wherein activation of said primary motor drives said coupling means and allows regulation of said control surfaces;
    means coupled with said coupling means for limiting movement of said coupling means in response to activation of said primary motor, said movement being limited to a preselected range about a reference point; and
    means coupled with said limiting means for positioning said reference point to allow continued movement of said coupling means when a limit of said range is reached whereby said actuator has a limited short term and an extended long term range of travel.

2. The invention of claim 1, wherein said positioning means comprises a secondary motor and said coupling means comprises a differential gear coupled with said primary and secondary motors and said control surfaces.

3. The invention of claim 3, wherein said differential gear comprises a primary input gear coupled with said primary motor, a secondary input gear coupled with said secondary motor, and an output gear coupled with said primary and secondary input gears and said control surfaces, wherein said primary and secondary input gears differentially drive said output gear.

4. The invention of claim 3, wherein said limiting means is coupled with said differential gear and limits the rotation of said output gear to said preselected range about said reference point.

5. The invention of claim 4, wherein said limiting means and reference point comprise a pin coupled with said primary input gear, said pin engagable with said output gear to prevent rotation of said output gear when said range limit is reached.

6. The invention of claim 3, wherein said primary and secondary input gears comprise end gears respectively coupled with said primary and secondary motors and side gears coupled with said end gears.

7. The invention of claim 6, wherein said side gears are oriented in spaced apart, facing relationship and wherein said output gear comprises pinion gears mounted on opposite ends of a spider member and positioned between said side gears, said spider member being coupled with a control rod whereby activation of said primary motor regulates movement of said control rod.

8. An aircraft control system having a dual channel actuator for regulating control surfaces of the aircraft, said actuator comprising:
    primary and secondary motors;
    a differential gear coupling said primary and secondary motors;
    said differential gear comprising a primary input gear driven by said primary motor, a secondary input gear driven by said secondary motor, and an output gear differentially driven by said primary and secondary input gears;
    an output shaft coupling said output gear and said control surfaces; and
    means coupled with said differential gear for limiting movement of said output gear to a preselected range about a reference point in response to movement of said primary input gear, wherein movement of said secondary input gear causes relative movement of said reference point to allow continued movement of said primary input gear when the end of said preselected range is reached whereby said actuator has a limited short term and an extended long term range of travel.

9. The invention of claim 8, wherein said limiting means and said reference point comprise a stop pin coupled with said primary input gear and engageable with said output gear for limiting movement of said primary input gear to said range.

10. The invention of claim 9, wherein said output gear comprises pinion gears mounted on opposite ends of a spider member and positioned between said primary and secondary input gears.

11. The invention of claim 10, wherein said spider member is coupled with said output shaft.

12. The invention of claim 10, wherein said primary and secondary output gears comprise end gears respectively coupled with said primary and secondary motors and side gears coupled with said end gears.

13. A method for limiting the short term authority of an autopilot system having a dual channel actuator while allowing for an extended long term authority, said method comprising the steps of:
    driving an output shaft of said actuator by movement of a primary channel of said actuator;
    limiting the short term movement of said primary channel to a preselected range about a reference point; and sensing when a limit of said range has been reached and after a preselected time then activating a secondary channel of said actuator to move said reference point in the direction of said range limit to allow continued movement of said primary channel, whereby the short term range of movement is limited while the extended long term range of movement is maintained.

14. The method of claim 13, including the step of coupling said primary and secondary channels with a differential gear comprising primary and secondary input gears and an output gear.

15. The method of claim 14, wherein said primary channel comprises a primary motor and said primary input gear and said secondary channel comprises a secondary motor and said secondary input gear, said input gears being differentially coupled with said output gear and said output gear being coupled with said output shaft.

16. The method of claim 14, wherein said reference point comprises a stop pin coupled with said differential gear.

* * * * *